(12) United States Patent
Werner et al.

(10) Patent No.: US 9,627,855 B2
(45) Date of Patent: Apr. 18, 2017

(54) SURGE ARRESTER

(71) Applicant: EPCOS AG, Munich (DE)

(72) Inventors: Frank Werner, Berlin (DE); Robert Hoffmann, Berlin (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 14/909,860

(22) PCT Filed: Aug. 27, 2014

(86) PCT No.: PCT/EP2014/068186
§ 371 (c)(1),
(2) Date: Feb. 3, 2016

(87) PCT Pub. No.: WO2015/028516
PCT Pub. Date: Mar. 5, 2015

(65) Prior Publication Data
US 2016/0190771 A1    Jun. 30, 2016

(30) Foreign Application Priority Data
Aug. 29, 2013   (DE) .................. 10 2013 109 393

(51) Int. Cl.
*H01J 17/26* (2012.01)
*H01T 4/12* (2006.01)
*H01C 7/12* (2006.01)
*H02H 9/06* (2006.01)

(52) U.S. Cl.
CPC ................. *H01T 4/12* (2013.01); *H01C 7/12* (2013.01); *H02H 9/06* (2013.01)

(58) Field of Classification Search
CPC .................................. H01C 7/12; H01T 1/14
USPC .................. 313/231.11, 231.31, 231.41, 620
See application file for complete search history.

(56) References Cited

U.S. PATENT DOCUMENTS

| 3,995,183 | A |   | 11/1976 | Lechner et al. |   |
| 4,084,208 | A | * | 4/1978  | Bazarian  .................. | H01T 1/20 |
|           |   |   |         |                 | 313/244   |
| 5,184,273 | A |   | 2/1993  | Tanaka et al.  |   |
| 6,362,945 | B1 | * | 3/2002 | Bobert ...................... | H01T 1/22 |
|           |    |   |        |                | 361/120   |
| 8,080,927 | B2 |   | 12/2011 | Boy et al.    |   |
| 2008/0218082 | A1 |   | 9/2008 | Boy et al.   |   |

FOREIGN PATENT DOCUMENTS

| CA | 2027288 A1 | 4/1991 |
| DE | 2418261 B2 | 5/1976 |
| DE | 102008029094 A1 | 1/2009 |
| EP | 1443539 A2 | 8/2004 |
| EP | 1841027 A2 | 10/2007 |
| JP | H0362484 A | 3/1991 |
| JP | 3283336 A | 12/1991 |
| JP | 200563721 A | 3/2005 |
| JP | 2009503795 A | 1/2009 |

* cited by examiner

*Primary Examiner* — Vip Patel
(74) *Attorney, Agent, or Firm* — Slater Matsil, LLP

(57) ABSTRACT

A surge arrester includes a gas-tight discharge chamber that is formed by at least one insulating body and two electrodes. The electrodes extend into the discharge chamber and include an electrode spacing with respect to one another and a wall spacing with respect to the insulating body inner wall. The electrode spacing is equal to twice the wall spacing or is less than twice the wall spacing.

11 Claims, 2 Drawing Sheets

SURGE ARRESTER

This patent application is a national phase filing under section 371 of PCT/EP2014/068186, filed Aug. 27, 2014, which claims the priority of German patent application 10 2013 109 393.0, filed Aug. 29, 2013, each of which is incorporated herein by reference in its entirety.

TECHNICAL FIELD

Embodiments of the invention are directed to a surge arrester with a gas-tight discharge chamber.

BACKGROUND

A surge arrester is used to limit dangerous or undesired overvoltages in electrical lines and devices. Surge arresters render it possible to avoid lines and devices becoming damaged as a result of an overvoltage.

Gas-filled surge arresters, which are also described as gas discharge tubes, are surge arresters by which the overvoltage is reduced as a result of a gas discharge self-arcing in the gas discharge tube. The surge arresters function according to the gas-physical principle of the arc discharge, wherein once the arrester response voltage is achieved, in short referred to as a response voltage or as an ignition voltage, an arc is formed within nano seconds in the gas-tight discharge chamber. The overvoltage is effectively short-circuited as a result of the ability of the arc to conduct a high current. Conventional gas discharge tubes generally have response voltages of 70V up to a few kilo volts which limits their range of use. Gas-filled surge arresters that have a maximum 10 kV response voltage have been hitherto available.

In order to protect medium voltage transformers in the effective voltage range of 3 kVrms to 36 kVrms (the suffix "rms" at the end of the unit subsequently describes a root mean square) from overvoltages that can occur by way of example during a lightning strike, it is possible to use surge arresters that comprise a series connection of metal oxide varistors and an air spark gap, as is described by way of example in CA 2027288. The disadvantage of the open air spark gap is that the response voltage is dependent upon the environmental conditions. In order to reduce this effect, the air spark gap must be protected by suitable measures and hitherto this has not been achieved satisfactorily.

SUMMARY

Gas-filled surge arresters have not been used for the above mentioned purpose since arresters with correspondingly high response voltages are not available.

Embodiments of the invention provide an alternative surge arrester that can be used to provide protection against high voltages. Such a surge arrester is to be suitable for protecting medium-voltage transformers.

The surge arrester comprises a gas-tight discharge chamber that is formed by at least one insulating body and two electrodes, wherein the electrodes extend into the discharge chamber. The electrodes comprise an electrode spacing with respect to one another and a wall spacing with respect to the insulating body inner wall, wherein the electrode spacing is equal to twice the wall spacing or is less than twice the wall spacing.

The discharge chamber is a gas-tight closed hollow chamber that is defined by the insulating body inner wall and also the electrodes at the end faces of the insulating body. The electrodes hermetically seal the end faces of the insulating body. This can be achieved by virtue of a vacuum-tight connection by hard solder.

The advantage of such a surge arrester is that the response voltage of the gas-tight surge arrester is not dependent upon the environmental conditions.

This surge arrester also functions in the case of high response voltages. This is achieved by virtue of the geometric specifications for the ratio of the electrode spacing and the wall spacing. The electrode spacing is equal to twice the wall spacing or less than twice the wall spacing. The following formula: $L = <2*a$ is consequently produced for the electrode spacing L and the wall spacing a. This dimensioning specification renders it possible to provide surge arresters that have a high response voltage and reliable arcing behavior, wherein undesired arcings are avoided even in the case of an operating alternating voltage.

By adhering to this dimensioning specification, the discharge occurs only across the gap between the electrodes. Undefined arcings and associated discharges that run along the insulating body inner wall are avoided. Consequently, arcing occurs reliably after a predefined response voltage is exceeded. Misfires at comparatively low voltages and wall discharges are avoided. The latter mentioned aspects apply in particular if ignition strips are omitted in particular along the insulating body inner wall.

By virtue of the described construction of the surge arrester, advantageously supported by omitting the ignition strips, undesired arcings across the gas discharge gap are reliably avoided even as the operating alternating voltage is applied, by way of example in the effective voltage ranges of 10 kVrms to 30 kVrms.

The response voltage of the arrester Udc is clearly above the maximum value of the operating voltage Uac. The following formula applies: $Udc > Uac * sqrt(2) * 1,2$; wherein sqrt(2) is the square root of 2. Consequently, a response voltage of the arrester of approx. 17 kV is produced for an operating alternating voltage of 10 kV.

In one advantageous embodiment, the electrodes comprise in each case a base region that is arranged at the end face on the insulating body, and a free end that extends into the discharge chamber. The base region can be placed on the end face of the insulating body. Alternatively, the base region can be inserted at least in part in the insulating body at its end face.

Such an electrode can be embodied as one piece or can comprise two or more mutually connected parts. The latter arrangement renders it possible to optimize the material in terms of the different requirements placed on the two electrode regions. The regions can be connected one to the other by conventional connecting methods, by way of example welding or hard soldering.

The free ends can be embodied in the form of pins. A pin-shaped free end has an elongated shape, by way of example essentially cylindrical, in particular circular cylindrical. The base region is embodied in an essentially disc-shaped manner in order to seal the end faces of the insulating body and consequently form the gas-tight discharge chamber. The disc-shaped base regions are small in height in comparison to the length and width of their base surface area. The discs can be round or have a differently shaped base surface area, by way of example a rectangular shape.

In one embodiment, the base region comprises one or multiple elevation between the region that is arranged on the insulating body end face and the free end; these elevations are arranged in a circumferential manner and extend in the direction of the discharge chamber. Such an elevation can be embodied as a circular elevation. Multiple elevations that are arranged along a circumferential path, e.g., of a circle, around the free end are also feasible. These elevations render it possible to position the electrode at the end face of the insulating body during the assembly process and to fit the electrode into the end face opening.

The insulating body can have a hollow cylindrical shape, in particular a hollow circular cylindrical shape which is associated with an easy production process.

The discharge chamber is filled with gas. The overvoltage is reduced by virtue of the gas discharge self-arcing. The gas charge of the discharge chamber can comprise nitrogen or gas mixtures with nitrogen and hydrogen, which is used as an insulating gas.

Such a surge arrester renders possible response voltages that are greater than 10 kV, in particular greater than 15 kV.

The electrode spacing can be between the 8 mm and 16 mm and the wall spacing can be between 5 mm and 9 mm. This dimensioning renders possible high response voltages.

BRIEF DESCRIPTION OF THE DRAWINGS

The above described arrangements are further explained hereinunder with reference to exemplary embodiments.

The drawings described hereinunder are not to be regarded as being true to scale, on the contrary the illustrations can be enlarged in individual dimensions, reduced or also distorted.

In the drawings:

FIG. 1 illustrates a perspective view of an exemplary embodiment of a surge arrester; and FIG. 2 illustrates a sectional view of this surge arrester.

DETAILED DESCRIPTION OF ILLUSTRATIVE EMBODIMENTS

Figure 1:
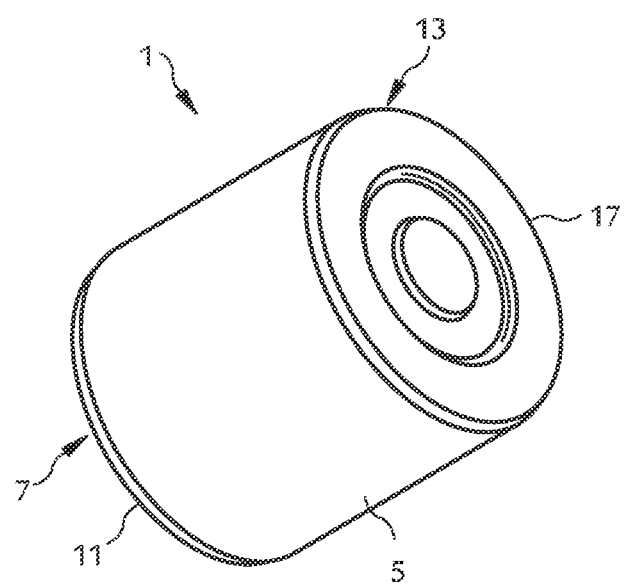

FIG. 1 illustrates a perspective view of a surge arrester 1. This surge arrester comprises a hollow cylindrical insulating body 5. A first electrode 7 and a second electrode 13 are arranged on the end faces of the hollow cylindrical insulating body and the electrodes define a hollow chamber inside the surge arrester 1; this hollow chamber is used as a gas-tight discharge chamber.

Only the base regions 11, 17 of the electrodes 7, 13 that seal the insulating body in order to form the gas-tight discharge chamber are evident in FIG. 1.

Figure 2:
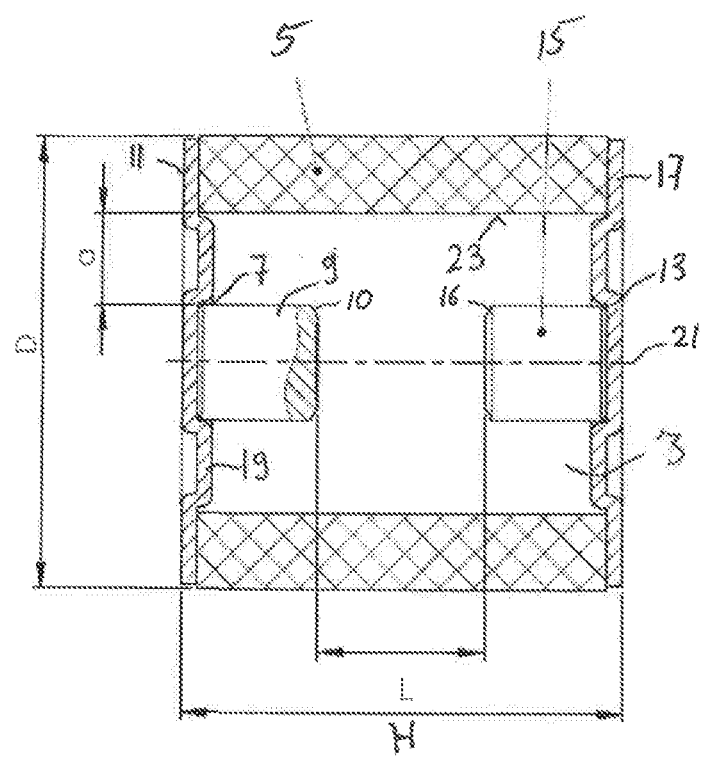

FIG. 2 illustrates a sectional view along the longitudinal axis 21 through the surge arrester 1 that is illustrated in FIG. 1.

The surge arrester 1 comprises a gas-tight discharge chamber 3 that is formed by the hollow circular cylindrical insulating body 5 and the first and the second electrode 7, 13 that are arranged on the end faces of the hollow circular cylindrical insulating body. The insulating body 5 can also have a different shape with a hole or a recess. The insulating body is produced from a non-conductive material, by way of example a ceramic material.

The first and the second electrode 7, 13 have in each case disc-shaped base regions 11, 17 and also free ends 9, 15 that protrude into the discharge chamber 3 so that the free ends 9, 15 protrude into the chamber that is encompassed by the insulating body 5. The base region 11, 17 is connected to the insulating body 5 in such a manner that the hollow chamber is sealed in a gas-tight manner. The outer contacting of the surge arrester 1 is performed by way of the outer faces of the base regions 11, 17.

The free ends 9, 15 are arranged in the center of the base regions 11, 17. The free ends protrude into the discharge chamber 3 and are aligned with respect to one another. The gas discharge occurs between the free ends 9, 15. The free ends 9, 15 are embodied in a pin-shaped manner. In this exemplary embodiment, the free ends have a circular cylindrical shape. Other shapes, by way of example a conical shape, are also feasible. In this exemplary embodiment, the free ends 9, 15 have a head region 10, 16 in which they are chamfered. Other embodiments of such a head region 10, 16 have other shapes that reduce the cross section, by way of example a tip, edge or step.

In this exemplary embodiment, the base regions 11, 17 comprise annular circumferential elevations 19 that extend into the discharge chamber 3 and the elevations are arranged between the region that is arranged on the insulating body end face and the free end 9, 15. Alternatively, multiple round, linear or other shaped elevations 19 are also feasible that are arranged in a circumferential manner on the insulating body inner wall 23. This elevation 19 or rather elevations 19 render it possible during the assembly process to precisely position the electrodes 7, 13 on the end faces of the insulating body 5. The elevation 19 extends as far into the discharge chamber interior as the free end 9, 15. Such elevations 19 can be produced by way of example by punching or stamping.

The electrodes 7, 13 can be metal, wherein different materials can be used for the base region 11, 17 and the free end 9, 15. The renders it possible to optimize the material in terms of the different electrode regions and their functions.

In this exemplary embodiment, both the insulating body 5 and also the electrodes 7, 13, in particular their free ends 9, 15, are embodied in a rotational symmetrical manner about the longitudinal axis 21 of the surge arrester 1. In addition, this exemplary embodiment is embodied in a mirror symmetrical manner. In particular, the elevations 19 and/or the base regions 11, 17 can deviate with respect to their shape or rather their base surface area from the rotational symmetrical shape. Base regions 11, 17 that have a rectangular base surface area or a base surface area that is straight on one side are also feasible in order to facilitate the assembly of the component.

The electrode spacing L is defined between the end faces of the free ends 9, 15 of the electrodes 7, 13, the electrode spacing extends in this exemplary embodiment parallel to the longitudinal axis 21. The free ends 9, 15 comprise a wall spacing a with respect to the insulating body inner wall 23. The wall spacing a is the spacing between the outer face of the free end 9, 15 and the adjacent insulating body inner wall 23; the wall spacing extends in this exemplary embodiment in a perpendicular manner with respect to the longitudinal axis 21. The electrode spacing L is selected so that it is equal to twice or at least less than twice the wall spacing a, in other words L=<2*a. This condition is also to be fulfilled in the case of free ends 9, 15 and/or an insulating body 5, the diameters of which vary along the longitudinal axis 21, for the different wall spacings beyond the connection site with or the transition to the base region and also preferably in the head region of the free ends.

Further characteristic variables of the surge arrester are its height H, which is measured between the outer faces of the base regions 11, 17 of the electrodes 7, 13 and its diameter D, which corresponds to the outer diameter of the insulating body 5.

The outer diameter D of such a surge arrester 1 can be by way of example 30 mm to 36 mm, the height H 22 mm to 36 mm. The electrode spacing L can be between 8 mm and 16 mm and the wall spacing a between 5 mm and 9 mm.

Such a gas-filled surge arrester 1 can have response voltages of 17 kV to 34 kV and is suitable for use in the case of operating alternating voltages of 10 kVrms to 20 kVrms. The gas charge can comprise nitrogen or gas mixtures with nitrogen and oxygen.

According to the IEC 60099-1 Standard, such a surge arrester gas has a loading capacity of 22 pulses of 10 kA and 8/20 µs, two pulses of 100 kA and 4/10 µs and also 20 pulses of 250 A and 2000 µs.

It is to be noted that the features of the embodiments and exemplary embodiments can be combined.

The invention claimed is:

1. A surge arrester comprising:
   a gas-tight discharge chamber formed by an insulating body, the insulating body having a wall and end faces at ends of the wall; and
   only two electrodes,
   wherein the two electrodes extend into the discharge chamber and comprise an electrode spacing with respect to one another and a wall spacing with respect to an inner wall of the insulating body, wherein the electrode spacing is less than or equal to twice the wall spacing,
   wherein each electrode comprises a base region arranged at one of the end faces of the insulating body, and a pin-shaped free end that extends into the discharge chamber,
   wherein the base region is embodied in an essentially disc-shaped manner,
   wherein the wall spacing is a spacing between an outer side face of the free end and the adjacent inner wall of the insulating body, and
   wherein the electrode spacing is a spacing between outer faces of the free ends facing each other.

2. The surge arrester according to claim 1, wherein the base region comprises an elevation arranged at a portion of the base region that is located between the end face of the insulating body and the free end.

3. The surge arrester according to claim 1, wherein the base region comprises a plurality of elevations that are arranged in a circumferential manner at a portion of the base region that is located between the end face of the insulating body and the free end.

4. The surge arrester according to claim 1, wherein the inner wall of the insulating body of the discharge chamber does not have an ignition strip.

5. The surge arrester according to claim 1, wherein the insulating body has a hollow cylindrical shape.

6. The surge arrester according to claim 1, wherein the surge arrester has a response voltage greater than or equal to 10 kV.

7. The surge arrester according to claim 1, wherein the discharge chamber comprises a gas charge that comprises nitrogen.

8. The surge arrester according to claim 7, wherein the gas charge comprises nitrogen and oxygen.

9. The surge arrester according to claim 1, wherein the electrode spacing is between 8 mm and 16 mm and the wall spacing is between 5 mm and 9 mm.

10. The surge arrester according to claim 1, wherein the electrodes are arranged in a mirror symmetrical manner.

11. A surge arrester comprising:
    a gas-tight discharge chamber formed by an insulating body; and
    only two electrodes,
    wherein the electrodes extend into the discharge chamber,
    wherein each of the electrodes comprises a base region arranged at an end face of the insulating body, and a free pin-shaped end that extends into the discharge chamber,
    wherein the electrodes are arranged in a mirror symmetrical manner,
    wherein the electrodes comprise an electrode spacing with respect to one another and a wall spacing with respect to an inner wall of the insulating body, the electrode spacing being less than or equal to twice the wall spacing,
    wherein the wall spacing is a spacing between an outer side face of the free end and the adjacent inner wall of the insulating body, and
    wherein the electrode spacing is a spacing between outer faces of the free ends facing each other.

* * * * *